United States Patent
Scriven et al.

(10) Patent No.: US 11,003,859 B2
(45) Date of Patent: May 11, 2021

(54) MACHINE-LEARNING AUTOMATED STRUCTURAL QUALITY ANALYSIS

(71) Applicant: International Business Machines Corporation, Armonk, NY (US)

(72) Inventors: Gerhardt J. Scriven, Indaiatuba (BR); Nikit Shah, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/206,270

(22) Filed: Nov. 30, 2018

(65) Prior Publication Data

US 2020/0175113 A1 Jun. 4, 2020

(51) Int. Cl.
*G06F 40/30* (2020.01)
*G06N 20/00* (2019.01)

(52) U.S. Cl.
CPC ............ *G06F 40/30* (2020.01); *G06N 20/00* (2019.01)

(58) Field of Classification Search
CPC ........ G06F 17/02; G06Q 10/10; G06N 20/00; G06N 5/02
USPC ............................ 704/1, 9, 10, 257, 270–275
See application file for complete search history.

(56) References Cited

U.S. PATENT DOCUMENTS

| | | | | |
|---|---|---|---|---|
| 7,228,524 B2* | 6/2007 | Bailey | ................. | G06F 11/3696 714/38.1 |
| 8,442,985 B2* | 5/2013 | Verma | ................... | G06Q 10/10 707/748 |
| 8,566,731 B2* | 10/2013 | Subramanian | ......... | G06Q 10/10 715/762 |
| 9,400,778 B2* | 7/2016 | Ramani | .................... | G06F 40/30 |
| 9,646,273 B2 | 5/2017 | Giraldo et al. | | |
| 9,760,340 B2 | 9/2017 | Jayaraman et al. | | |
| 2014/0245254 A1 | 8/2014 | Padmalata et al. | | |
| 2017/0003937 A1* | 1/2017 | Huebra | ..................... | G06F 8/20 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Jesse S Pullias
(74) *Attorney, Agent, or Firm* — Heslin Rothenberg Farley & Mesiti P.C.; Scott Dobson, Esq.

(57) ABSTRACT

A method, computer program product, and a system where a processor(s) obtains, a requirement comprising a structure defined by textual content. The processor(s) identifies content relevant to predefined label(s) in the structure, based on applying a natural language classification algorithm to the structure; each predefined label indicates an atomic function. The processor(s) generates via the natural language classification algorithm, an array of values for each label; each value corresponds to a level of confidence the natural language classification algorithm correctly identified the atomic function indicated by each predefined label, in the structure. The processor(s) ranks the values in the array of values by confidence level, pairing values with labels. The processor(s) evaluates the pairs, utilizing a linear regression, to identify a portion of the pairs relevant to the requirement which are above a relevance threshold. The processor(s) generate a structural quality value for the requirement from a fixed set.

18 Claims, 8 Drawing Sheets

(56) References Cited

OTHER PUBLICATIONS

Anneniaz et al. "Natural Language Requirements Quality Analysis Based on Business Domain Models", 2013, https://dl.acm.org/citation.cfm?id=3107748, 6 pages.

Tarawneh, "Software Requirements Classification Using Natural Language Processing and SVD", International Journal of Computer Applications (0975-8887) vol. 164—No. 1, Apr. 2017, 6 pages.

Parra et al., "A Methodology for the Classification of Quality of Requirements Using Machine Learning Techniques", Information and Software Technology 67 (2015) 180-195.

* cited by examiner

MACHINE-LEARNING AUTOMATED STRUCTURAL QUALITY ANALYSIS

BACKGROUND

A challenge in software design is translating vague, ambiguous and non-atomic business requirements into more granular system level requirements and/or solution design. Issues can be introduced into the process, and the software, when a requirement is misinterpreted early in the process. Addressing these errors, which were introduced early in the communication of requirements, are the most costly system errors to correct and there is significant financial value in providing a system, a sub-system, and/or a service that can automatically and accurately classify such issues with requirements before they are handed off for translation or design related work. By avoiding issues from the outset that are the result of problematic requirements, the software design process becomes more efficient and effective. In general, requirements that can be effectively utilized in a software design process will be specific (i.e., not generic or open to misinterpretation), atomic (i.e., of or forming a single irreducible unit or component in a larger system), and unambiguous (i.e., not open to subjective interpretation). The atomicity of individual requirements is desirable because when multiple requirements are stated as a single requirement, each individual requirement is more likely to be missed, and this introduces risk into the design. Additionally, if issues do exist in development, utilizing atomic requirement to troubleshoot the issue enables a debugger to trace and verify issues more readily, as verifying a requirement that in actuality is a consolidation of multiple individual requirements can pose a challenge, as a single binary verification of implementation may not be possible. Being able to screen initial requirements to determine whether they comport with these standards before implementation into software development would increase the efficiency of the development process as a whole.

SUMMARY

Shortcomings of the prior art are overcome and additional advantages are provided through the provision of a method for determining structural quality of a requirement. The method includes, for instance: obtaining, by one or more processors, a requirement, wherein the requirement comprises a structure defined by textual content; identifying, by the one or more processors, content relevant to one or more predefined labels in the structure, based on applying a natural language classification algorithm to the structure, wherein each predefined label indicates an atomic function; based on the identifying, generating, by the one or more processors, via the natural language classification algorithm, an array of values for each predefined label of the one or more predefined labels, wherein each value in the array of values corresponds to a level of confidence the natural language classification algorithm correctly identified the atomic function indicated by each predefined label, in the structure; ranking, by the one or more processors, the values in the array of values, wherein each value is paired with a corresponding predefined label of the one or more predefined labels, in descending order, based on the level of confidence of each predefined label; evaluating, by the one or more processors, the pairs, utilizing a linear regression, to identify a portion of the pairs above a relevance threshold, wherein the portion comprises one or more predefined labels relevant to the requirement; and based on identifying the one or more predefined labels relevant to the requirement, generating, by the one or more processors, a structural quality value for the requirement, wherein the structural quality requirement value is a value in a fixed set of structural quality requirement values.

Shortcomings of the prior art are overcome and additional advantages are provided through the provision of a computer program product for determining structural quality of a requirement. The computer program product comprises a storage medium readable by a processing circuit and storing instructions for execution by the processing circuit for performing a method. The method includes, for instance: obtaining, by one or more processors, a requirement, wherein the requirement comprises a structure defined by textual content; identifying, by the one or more processors, content relevant to one or more predefined labels in the structure, based on applying a natural language classification algorithm to the structure, wherein each predefined label indicates a atomic function; based on the identifying, generating, by the one or more processors, via the natural language classification algorithm, an array of values for each predefined label of the one or more predefined labels, wherein each value in the array of values corresponds to a level of confidence the natural language classification algorithm correctly identified the atomic function indicated by each predefined label, in the structure; ranking, by the one or more processors, the values in the array of values, wherein each value is paired with a corresponding predefined label of the one or more predefined labels, in descending order, based on the level of confidence of each predefined label; evaluating, by the one or more processors, the pairs, utilizing a linear regression, to identify a portion of the pairs above a relevance threshold, wherein the portion comprises one or more predefined labels relevant to the requirement; and based on identifying the one or more predefined labels relevant to the requirement, generating, by the one or more processors, a structural quality value for the requirement, wherein the structural quality requirement value is a value in a fixed set of structural quality requirement values.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
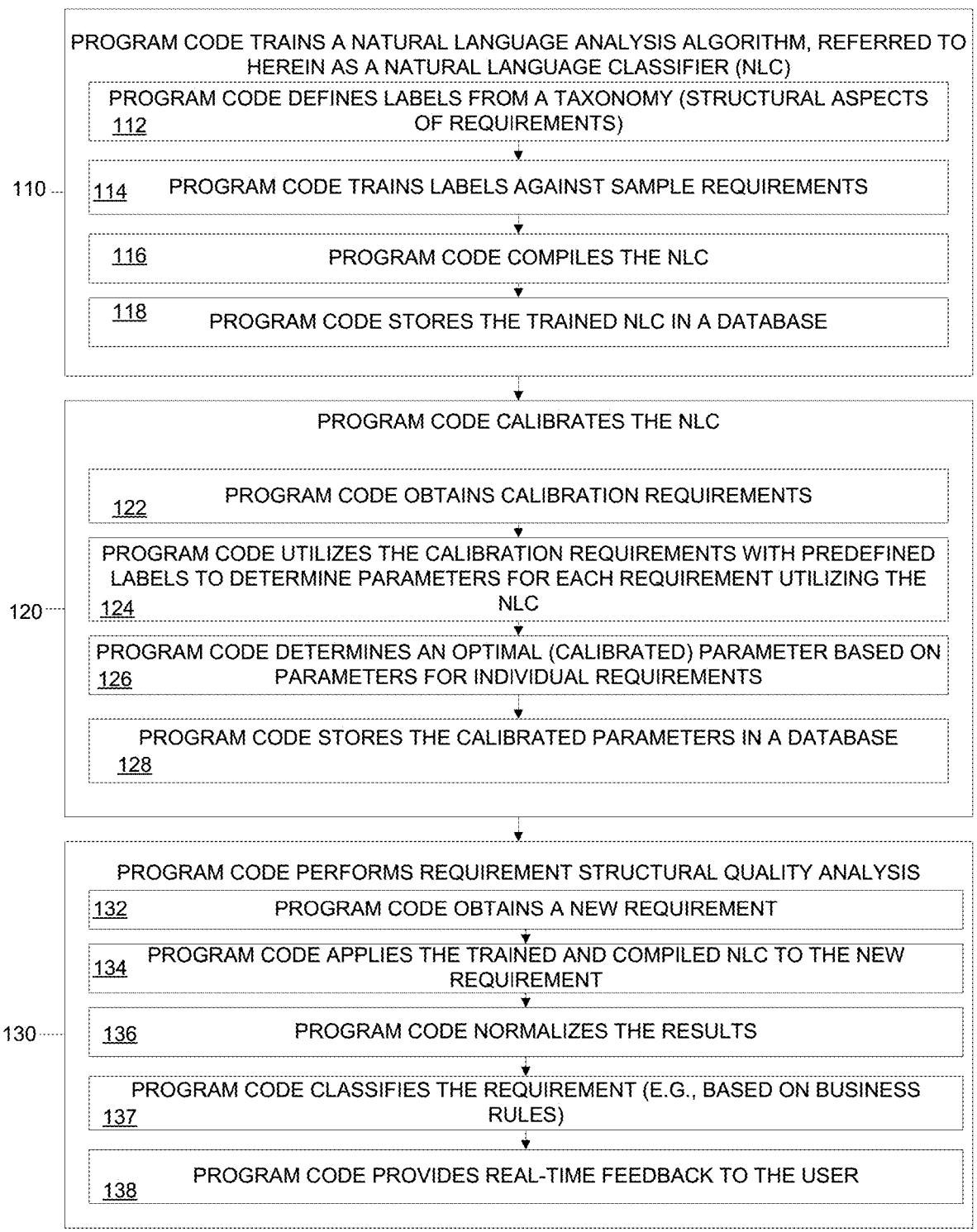
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
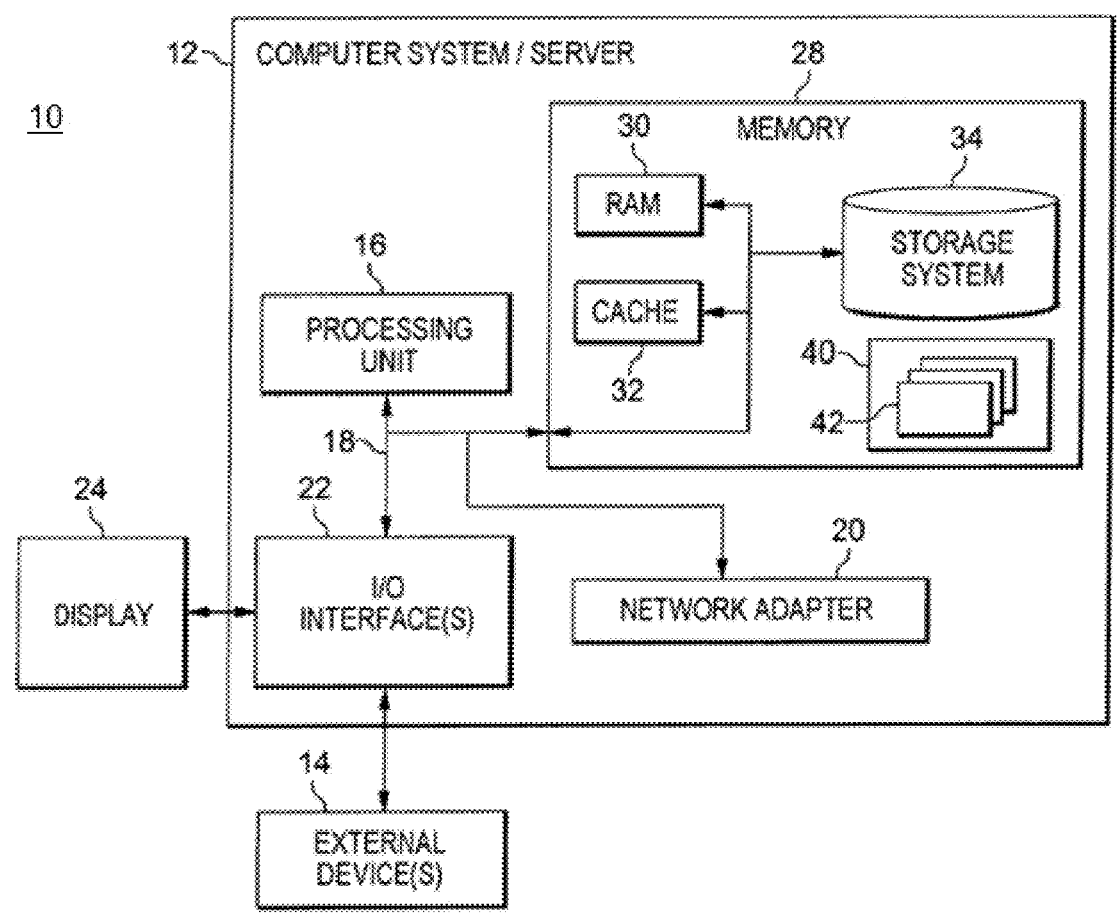
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computing system, where program code executing on one or more processors utilize machine-learning and natural language processing to analyze delineated requirements for software development and automatically provide, in real-time, evaluations (binary, scaled, etc.) of the requirements to determine whether the requirements each meet predefined measures. For example, in some embodiments of the present invention, the predefined measures represent the structural quality of each requirement (i.e., not semantic quality nor business value). In some embodiments of the present invention, the program code determines, and provides to users, in real-time, evaluations of the structural quality of each requirement, based on whether the requirement is: specific, atomic, and/or unambiguous. In some embodiments of the present invention, the program code can attempt to update a given requirement that does not meet the quality and provide the updated requirement to the user, for confirmation/rejection, etc.

In order to provide real-time structural analyses of requirements, in accordance with some embodiments of the present invention, the program code, based on obtaining a given input requirement, utilizes previously trained (by the program code) natural language analysis algorithms (e.g., a natural language classier) to categorize the given input requirement against a set of labels previously defined by the program code (e.g., when training the algorithms). In some embodiments of the present invention, based on completing this analysis, the program code returns, to the user, via a client (e.g., a graphical user interface (GUI), notification, electronic message, etc.) an array of confidence values for each label. In this embodiment, each value relates to a level of confidence, as determined by the natural language analysis, and a high level of confidence translates to an approval of input with respect to a corresponding label. In some embodiments of the present invention, the program code sorts an array of confidence values comprising label/value pairs from a highest value to a lowest value to identify a result representative of a label that matches best against the given input requirement. The program code can determine at which point a next label/value pair is no longer a relevant match to the given input requirement using linear regression. The program code automatically generates a structural quality classification label for the given input requirement. The program code makes this determination, in part, by utilizing predefined rules to provide a result from a set of possible results. For example, the results can include, but are not limited to: 1) a requirement is specific and atomic; 2) a requirement is specific, but not atomic; 3) a requirement is not specific; 4) a requirement is either not specific or not atomic; and 5) a requirement contains ambiguous terminology.

Embodiments of the present invention are both inextricably linked to computing and provide significantly more functionality that existing interface selection systems and methods. First, embodiments of the present invention are inextricably linked to computing because they utilize a self-learning model and generate and train analytics to solve, in this instance, the evaluation of requirements, with increasing speed and accuracy. It is through the use of a computing platform that the real-time analysis, with ever-increasing intelligence, is possible. Thus, embodiments of the present invention, through the implementation and training of classifiers, are able to leverage subject matter expertise (SME) in order to provide quality analytics related to the structural quality of requirements, in order to provide a more efficient and effective software design workflow.

Second, embodiments of the present invention include various aspects that provide significantly more than existing software requirement analysis approaches. For example, rather than, like some existing approaches, require the constant utilization of SME to adjudge the quality of requirements, which is not cost effective and is time-consuming, in embodiments of the present invention, the program code includes an automated process that can utilize initial SME knowledge as a once-off to provide intelligence to the eventual analytical model, including but not limited to: defining business operations that are valid for the prospective product and/or service, and identifying historically relevant business requirements that can be used as training for a natural language classifier (NLC) component of the program code. The program code in embodiments of the present invention can utilize each business operation provided by the SME, going forward, as a label and/or class for the program code of the NLC. Thus, instead of a continuous necessity for SME input, the program code in embodiments of the present invention initially utilizes SME for guidance, to train the NLC classifier, and through use and over time, the NLC classifier improves without additional SME data.

Aspects of various embodiments of the present invention also provide advantages over existing approaches in that existing approaches are subjective, which embodiments of the present invention inject consistency and objectivity into evaluation of requirements. Current approaches predominantly include having an individual evaluate a set of requirements, which results in inconsistent and subjective evaluations. This inconsistency is eliminated through the usage of aspects of some embodiments of the present invention. In embodiments of the present invention, program code utilizes a machine learning algorithm and will therefore apply the same framework to each requirement evaluated, garnering consistent results. As will be discussed herein, in some embodiments of the present invention, to train the algorithm to perform consistent analysis, program code: 1) identifies a business operations taxonomy as a once-off utilizing domain SMEs; and 2) trains a NLC with quality historical requirements, with the once-off help from domain SMEs.

One advantage of some embodiments of the present invention is that they can provide automated, real-time, accurate feedback on business requirements' structural quality. The timing and comprehensive nature of this intelligence can result in defect avoidance downstream and associated cost savings to the user of the system. Aspects of some embodiments of the present invention can be integrated into an authoring tool to provide real time advice, as a writer composes a requirement.

Although aspects of the present invention are illustrated in the context of analyzing business requirements and providing a quality metric, one of skill in the art will recognize the applicability of the aspects herein beyond this specific implementation. For example, aspects of some embodiments of the present invention can be utilized to identify a primary issue being complained about in a customer grievance or customer feedback survey. In this example, data is collected through various surveys and the feedback can be large pieces of text, where the customers elaborately explain the issue/grievance. Despite disparities in the format of the surveys and the entries of the customers, program code executing on one or more processor in embodiments of the present invention can analyze the feedback and identify the primary issue. The correct classification of the unstructured information (e.g., multiple labels in the unstructured information) provided through customer feedback and timely action taken to address the specific issue, and/or set of issues, in the case of multiple labels being classified, with confidence, can enable a service provider or merchant to provide a superior level of service to customers.

FIG. 1 is a general workflow 100 that illustrates certain aspects of some embodiments of the present invention. To this end, as illustrated in the workflow 100, the program code employs both natural language classification and linear regression (to predict/explain the relationships between parameters or variables) to provide rapid, automated feedback regarding the structural integrity and quality of the business requirements subjected to analysis. The workflow 100 can be implemented into a variety of technical environments, including but not limited to, a stand-alone system, a module of an existing system (e.g., a requirements authoring tool), and/or as part of a service that can be published and available via a shared distributed computing system, including a cloud computing system. In some embodiments of the present invention, the program code ultimately provides a readout on the structural quality of an input business requirement. However, to provide this definitive readout, as illustrated in FIG. 1, the program code trains a natural language analysis algorithm, referred to herein as a natural language classifier (NLC) (110), calibrates the aspects of the system, including the NLC (120), and performs the requirement structural quality analysis (130), utilizing the trained and calibrated NLC. In some embodiments of the present invention, for each requirement analyzed by the NLC, the program code determines one of the following structural quality determinations: 1) the requirement is specific and atomic, 2) the requirement is specific, but not atomic, 3) the requirement is not specific, 4) the requirement is either not specific or not atomic, and/or 5) the requirement contains ambiguous terminology.

Referring to FIG. 1, in some embodiments of the present invention, program code executing on one or more processor, trains a natural language analysis algorithm, referred to herein as a natural language classifier (NLC) (110). When determining the quality of business requirements (after being trained), the NLC categorizes input against a set of predefined labels, and returns an array of confidence values for each label, where the values relate to the level of confidence the classifier has that the match of the input to the corresponding label is accurate. The NLC can be a custom implementation or can leverage the functionality of existing NLC services, including but not limited to, IBM Watson® NLC. IBM Watson® is a product of International Business Machines Corporation. IBM Watson® is a registered trademark of International Business Machines Corporation, Armonk, N.Y., US. IBM Watson® NLC is a non-limiting example of a classifier that can be utilized in some embodiments of the present invention and is discussed for illustrative purposes, only, and not to imply, implicitly or explicitly, any limitations regarding cognitive agents that can comprise aspects of embodiments of the present invention. IBM Watson® NLC is available as an application programming interface (API) of IBM Watson®. Specifically, some embodiments of the present invention access IBM Watson® NLC as a service available through the IBM Watson® Developer Cloud that can surface the most relevant information from a collection of documents, via concepts/visual insights, trade off analytics, document conversion, and/or relationship extraction. For example, in an embodiment of the present invention, one or more programs analyze the requirements utilizing the NLC. As IBM Watson® NLC is only one example of a commercial NLC that can be utilized in embodiments of the present invention, some embodiments of the present invention utilize custom implementations of standard text classification algorithms such as the Naïve-Bayes classifier together with an industry-recognized stemmer, such as the Porter Stemmer. The physical implementation of aspects of the present invention can vary depending on the choice of NLC.

Returning to FIG. 1, to train the NLC, the program code defines labels from a taxonomy (structural aspects of requirements) (112). The program code trains labels against sample requirements (114), and compiles the NLC (116). In some embodiments of the present invention, these requirements are stemmed before being input, meaning that the program code applies a stemmer algorithm to the requirements. This algorithm provides the base root of the input words in the requirements, regardless the word conjugation in the context of a sentence. The algorithm recognizes "stem" words embedded in other words (e.g., "eats", "eating", and "eatery" share the common stem of "eat"). Utilizing stemmed requirements reduces training data and input data into this stemmed form and improves the classification accuracy. One example of a stemmer that can be utilized in embodiments of the present invention is The Porter stemmer.

In embodiments of the present invention, compiling the NLC (116) refers to taking actions to make the trained NLC available for re-use in multiple searches, without requiring the program code to retrain the NLC each time it is utilized. Thus, in compiling the NLC, the program code persists the trained in-memory model at a location accessible to the program code and to the one or more processors executing the program code, for use in future searches. In some embodiments of the present invention, the program code persists the NLC by storing it in a text file that it stores to disk. Based on compiling the NLC in this manner, when reusing the trained data, the file is read from disk into memory and can be queried via the classifier program code.

In some embodiments of the present invention, the program code trains the NLC against labels that align with atomic functions, such as atomic business functions. These functions can include, but are not limited to: "capture customer data", "qualify customer credit", and/or "generate customer invoice", etc. As understood in the context of some embodiments of the present invention, a business function is an atomic piece of work that results in business value. The program code stores the trained NLC in a database (118), such that the program code can apply the NLC to future requirements.

In some embodiments of the present invention, the program code calibrates the NLC (120). By calibrating the NLC (and other aspects of the program code that interact with the NLC), the program code: 1) normalizes the output confidence value array that the NLC component produces; and 2) calibrates a set of parameters that will act as boundary values that assist with the structural quality assessment of requirements.

The program code normalizes the confidence values so that calibrated parameters can be applied consistently. Normalizing the values can increase the accuracy of the feedback because based on obtaining results of the NLC analysis (e.g., an array of label values), the program code normalizes the results and utilizes the calibrated parameters (136) in order to classify the requirement (e.g., based on business rules) (137) and provides real-time feedback to the user (138).

The calibration includes adjusting the parameters for determining that a given label is applicable to a requirement. To this end, the program code trains the NLC on historical requirements that are known to align (within an acceptable threshold) with the predefined labels. In some embodiments of the present invention, the program code obtains calibration requirements (122). In some embodiments of the present invention, these requirements are historical requirements that are known to align (within an acceptable threshold) with the predefined labels.

The calibration requirements are manually labeled against allowed categories. The program code utilizes the calibration requirements with the predefined labels to determine parameters for each requirement utilizing the NLC (124). These parameters enable the program code to recognize data that coordinates with the labels. Thus, the program code determines an optimal (calibrated) parameter based on parameters for individual requirements (126). In some embodiments of the present invention, the program code stores the calibrated parameters in a database (128). The database can be the same database or a different database or a different structure than that used by the program code to store the trained NLC.

In some embodiments of the present invention, the program code performs requirement structural quality analysis (130). To that end, the program code obtains a new requirement (and/or multiple new requirements as the analysis can be multi-threaded) (132). The program code applies the trained and compiled NLC to the new requirement (134). Based on obtaining results of the NLC analysis (e.g., an array of label values), the program code normalizes the results by utilizing the calibrated parameters (136). The program code classifies the requirement (e.g., based on business rules) (137) and provides real-time feedback to the user (138).

As discussed above, the program code utilizes linear regression in determining the results of the application of the NLC. In some embodiments of the present invention, the program code classifies the requirement (with the NLC) and generates an array of label/value pairs, sorted from highest to lowest values. The values represent a confidence level (typically a value between 0 and 1), as determined by the NLC, that the input string (from the requirement) matches each individual label. By sorting the result array from highest to lowest value, result[0] represents a label that matches best against the original input (i.e., the requirement).

In part because the goal of the program is to generate a streamlined and definitive requirement evaluation (e.g., the requirement is specific and atomic, the requirement is specific, but not atomic, the requirement is not specific, the requirement is either not specific or not atomic, and/or the requirement contains ambiguous terminology), a user can only desire the result[0] value, as it represents the best matching label/class for the given input. However, if the original input references concepts embodied in more than one label, the program code and/or the user could desire to consider any other relevant label/value pair. Thus, in some embodiments of the present invention, the program code determines (performing a linear regression) which of the other resultant label/value pairs meet a predefined threshold of relevance, and which do not meet the threshold. The program code comprising the NLC can return a label value pair for every label that exists. Thus, further processes and or manual adjustments by the program code can determine whether each result provided by the NLC is a valid (useful) result or not. Although the result[0] represents the best mapping, the program code can determine that this result is not meaningful. The program code utilizes linear regression to make this determination and specifically, to determine at which point a (next) label/value pair is not a relevant match to the input data (i.e., the requirement). Through linear regression, the program code provides a structural quality classification label for each input requirement.

Figure 2:
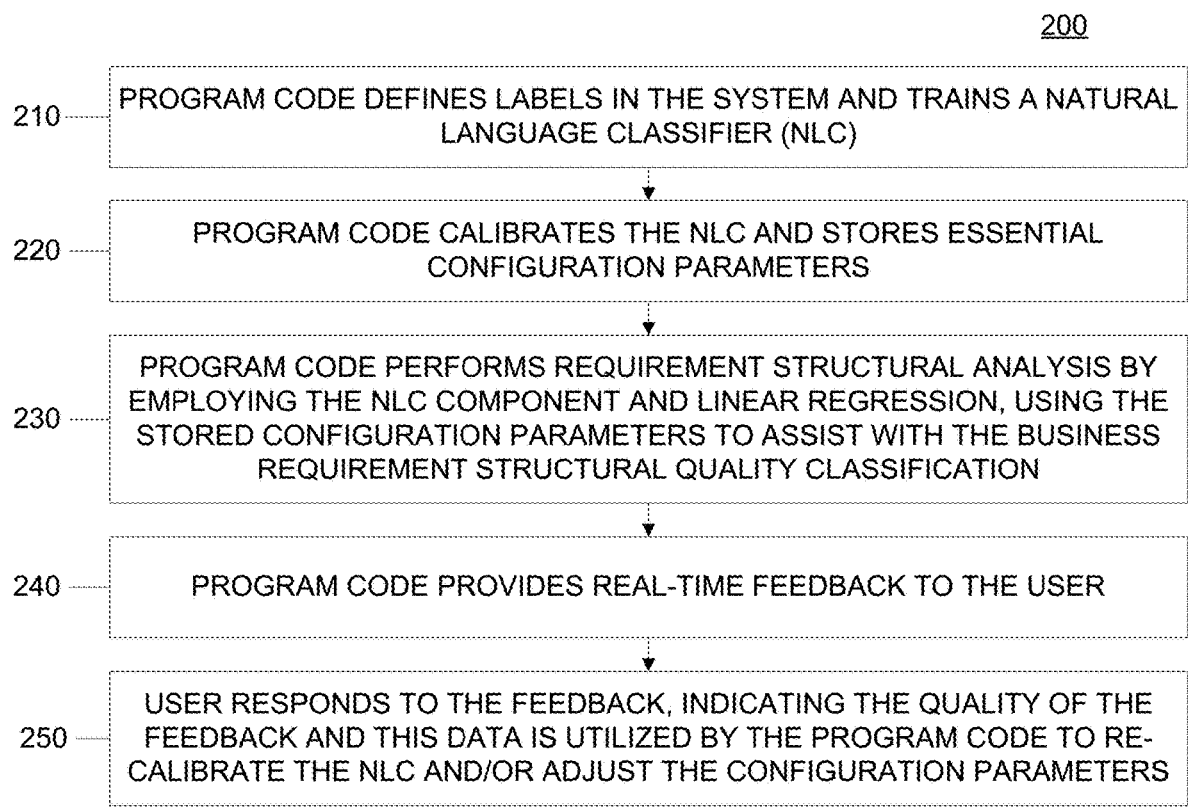
FIG. 2 is a workflow illustrating certain aspects of an embodiment of the present invention.

FIG. 2 is a workflow 200 that provides an overview of various aspects of the present invention. In an embodiment of the present invention, the program code defines labels in the system and trains the NLC (210). The program code calibrates the NLC and stores essential configuration parameters (220). The program code performs requirement structural analysis by employing the NLC component and linear regression, using the stored configuration parameters to assist with the business requirement structural quality classification (230). The program code provides real-time feedback to the user (240). In some embodiments of the present invention, the user responds to the feedback, indicating the quality of the feedback and this data is utilized by the program code to re-calibrate the NLC and/or adjust the configuration parameters (250).

Figure 3:
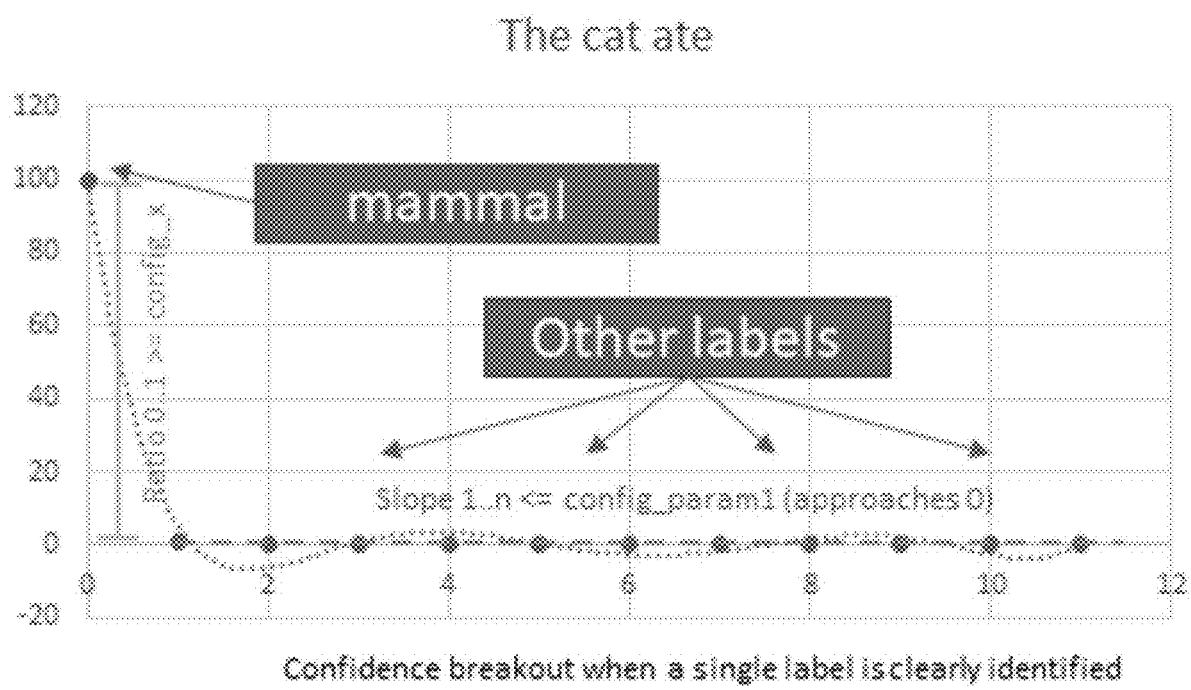
FIG. 3 is an illustration of an example relevant to certain aspects of some embodiments of the present invention.
Figure 4:
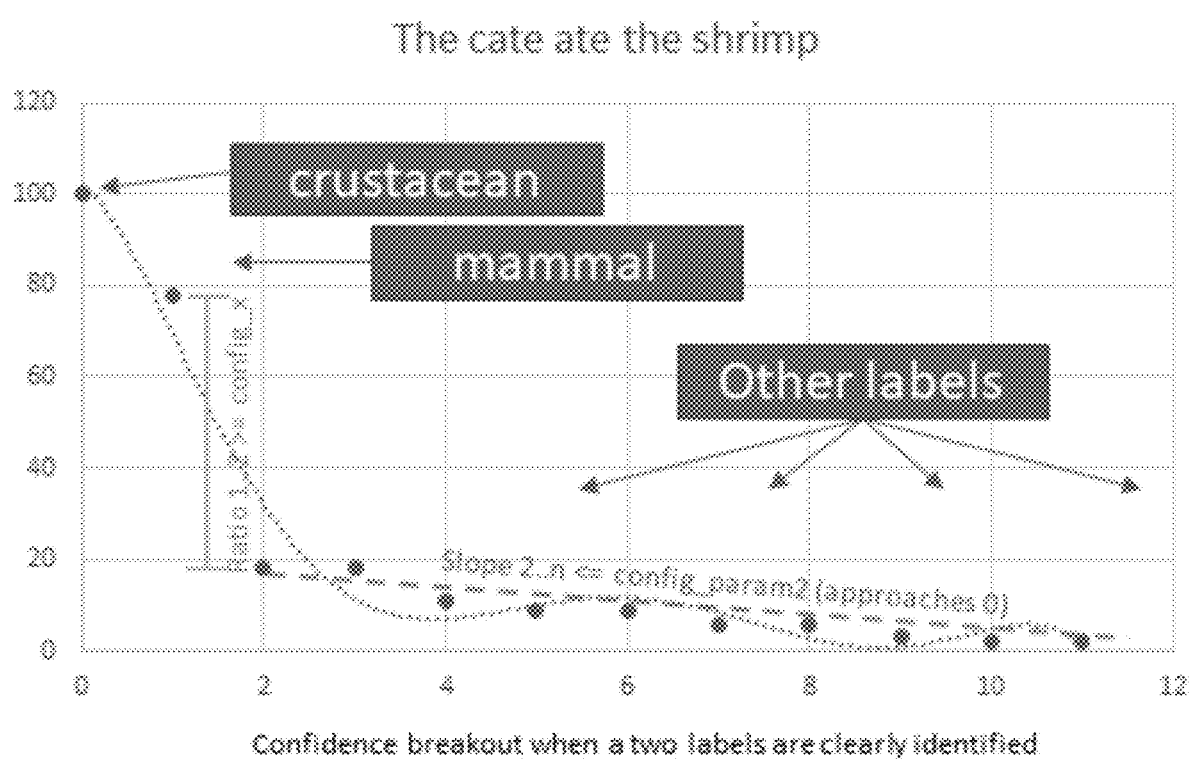
FIG. 4 is an illustration of an example relevant to certain aspects of some embodiments of the present invention.
Figure 5:
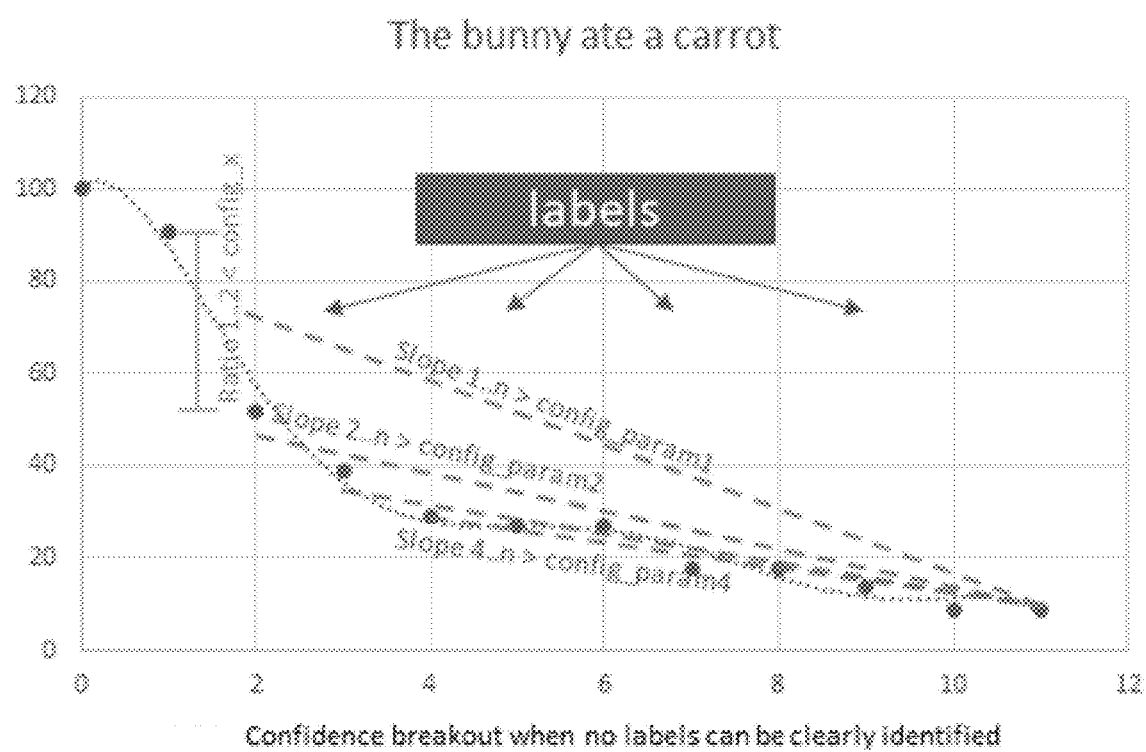
FIG. 5 is an illustration of an example relevant to certain aspects of some embodiments of the present invention.

FIGS. 3-5 provide examples of the functionality of an NLC that is relevant to its functionality with the context of some embodiments of the present invention. The examples in these FIGS. are simplified to comprehensively illustrate the classification. The specific example NLC in FIGS. 3-5 is a hypothetical natural language classifier definition that identifies classes of animals against very simple training statements, rather than an NLC that enables the program code in embodiments of the present invention to evaluate the structural quality of business requirement for software design. Below are the training statements utilized to train the example animal-related NLC:

```
"intent":"mammal" , "trainingStatementArray":["cat purr","dog
bark","human think","fox quick"],
    intent":"reptile" , "trainingStatementArray":["snake slither","lizard bask]",
"intent":"fish" , "trainingStatementArray":["shark swim", "sardine jump"],
    "intent":"bird" , "trainingStatementArray":["hawk swoop","owl hoot","dove
fly"],
    "intent":"insect" , "trainingStatementArray":["grasshopper hop","butterfly
flutter by","ant march"],
    "intent":"crustaceon" , "trainingStatementArray":["shrimp dig", "lobster
pinch"],
    ...
    ... other intents
    ...
    "intent":"ambiguous","trainingStatementArray":["many","few","some","quic
kly"]
```

Training the NLC with the statements above enables the NLC to identify a type of animal based on input. To guard the quality of the determinations, the "ambiguous" is triggered when terms such as "many", "few", and so on are used in the input text. As discussed above, this type of aspect is also integrated into embodiments of the present invention to enable the program code to determine that a given requirement is atomic.

As discussed in FIG. 1, the program code in embodiments of the present invention, utilizing, the NLC, evaluates a given requirement (e.g., input statement) against every label, and returns an array of results (e.g., a confidence level) which can be a numeric value between 0 and 1, for example, for each defined label. The example above for classifying animals can be utilized to illustrate this aspect and to demonstrate potential output results.

One possible input in this example is "The cat ate." In this case, the program code can determine that a single identifier (mammal) is referenced. FIG. 3 illustrates an NLC response, plotted as a set of label number versus values, where the values are normalized and represented in decreasing order. In FIGS. 3-6, the x-axis represents the result set labels, sorted in decreasing value order (and hence the numeric labeling) that are returned by the program code of the NLC. The y-axis represents a normalized confidence level for each label. As illustrated in FIG. 3, because of the singular nature of the input, result [0] is significantly higher than result [1], and results [1] through [10] are approximately the same (i.e., drawing an aggregate line between data points 1 through 10 will produce a flat slope). Within the context of this invention, the program code could determine, based on this type of confidence graph shape, that the input is associated with a requirement that is both specific and atomic, since the program code determined one high confidence label in the total result set, as illustrated in FIG. 3.

FIG. 4 illustrates an NLC analysis of an input with two high confidence identifiers. In this example the input is "The cat ate the shrimp." The program code of the NLC analyzes this input and locates two high confidence identifiers, crustaceans and mammals. In FIG. 4, crustaceans and mammals, correspond to result[0] and result[1], respectively. As illustrated in FIG. 4, result[2] through result[10] are far lower than result[1], and all are of similar value (i.e., an aggregate line drawn between data points 2 through 10 will yield a flat slope). Based on the dual high confidence values, the program code (utilizing the NLC) associates the confidence data shape with specificity, but not atomicity since more than one high confidence label had been identified.

FIG. 5 demonstrates the functionality of the NLC when data is input that it has not been trained to analyze. In FIG. 5, the input is "The bunny ate the carrot." Note that none of the terms in this input were referenced in the NLC label training (the example above). So, even while a bunny is a mammal, the program code of the NLC has not been trained to recognize it as such. This lack of confidence is reflected in FIG. 5, which shows that the normalized confidence distribution reflects this scenario. The ratio between result [0] and result[1] is measurably smaller than the results in FIG. 3 ("The cat ate.") and the ratio between result [1] and result[2] is measurably smaller than the results in FIG. 4 ("The cat ate the shrimp"). Additionally, the program code analysis shows that the other label values do not flatten out, as had been the case in FIGS. 3-4. Thus, based on the analysis of the NLC, the program code determined that that the input is akin to a vague requirement (i.e., it is not specific enough to trigger a high confidence NLC match).

Another possible result in embodiments of the present invention from an NLC analysis is the determination that a requirement is ambiguous. This aspect can be demonstrated in the context of the current example using the input "The cat ate quickly." In this case, the program code determines that the top result is "ambiguous" due to usage of the descriptor "quickly" in the input. This example demonstrates that the in embodiments of the present invention, the program code of the NLC provides a technique to detect ambiguous statements in input requirements.

Returning, to FIG. 1, in an embodiment of the present invention, the program code defines labels to be utilized in language analysis and trains an NLC to perform this analysis (110). In some embodiments of the present invention, the user, utilizing an interface of a client, can define, update, and/or delete a set of discreet classifier labels (112). In some embodiments of the present invention, these labels can be added, deleted, or edited at any time and can be persisted to a database of choice. A discussed above, because commercial solutions can be integrated into the NLC aspect of some embodiments of the present invention, a label definition facility can be provided by the commercial solution and utilized in embodiments of the present invention. Returning to the non-limiting example of IBM Watson® NLC, IBM Watson® Natural Language Service can be utilized to provide this functionality and is accessible to the program code of embodiments of the present invention via an API available as part of this service. In some embodiments of the present invention, the program code can provide (e.g., via a graphical user interface on a client) guidance to the user, who is engaged in generating labels. The program code can also automatically generate the labels in some embodiments of the present invention. In either case, the program code guides the definition of distinct, atomic functions. Some examples of labels are provided above and are examples of long running client functions, including atomic business functions, such as the installation or upgrade of a service. As understood by one of skill in the art, many atomic functions can be orchestrated together to form a long running workflow. For example, installing a service for a customer can be comprised of more than one atomic function, including, but not limited to, generating a contract, validating whether a service offering is available at a requested address, and offering a discount to the customer. Defining more specific labels (i.e., limiting a label to an atomic function) can provide a more granular decomposition of business functions.

The program code trains labels against sample requirements (114). As discussed above, in some embodiments of the present invention, a stemmer is applied to the requirements by the program code. These business requirements can be understood as a set of training statements, such as the example utilized in FIGS. 3-6. In embodiments of the present invention, each training requirement addresses one class/label. The requirements can be stemmed (e.g., utilizing a stemmer such as the Porter Stemmer) to reduce text phrases to a condensed format. Utilizing a stemmer enables the program code to trim text that is not relevant to the core of each requirement. Trimming extraneous text can reduce false positives in the analysis. The program code compiles the trained NLC (116), meaning that it makes the trained NLC available for re-use in multiple searches, without requiring the program code to retrain the NLC each time it is utilized, by persisting the trained in-memory model at a location accessible to the program code and to the one or more processors executing the program code.

Referring to FIG. 1, as aforementioned, the program code calibrates the NLC (120) in order to: 1) normalize the output confidence value array that the NLC component produces; and 2) calibrate a set of parameters that will act as boundary values that assist the program code in making a structural quality assessment of requirements. The program code normalizes the values returned by the NLC component for consistency so that the same set of parameters (e.g., x, param1 and param2) can be utilized to address the same issue. The calibration enhances the efficacy of the process because output confidence values of NLC components can be sensitive to the number of labels, the number of training statements per label on average, as well as the average length of individual training and input statements. In the calibration process, the program code establishes a set of parameters (e.g., x, param1, param2 . . . param_n) (124). In this example x represents the cut off value ratio between a label value array item and the following item value in the array. The program code measures ratios against x results either in a result that is TRUE or FALSE. For example, if x is set to be 3, through calibration, the following results can be determined by the program code:

If result[0]=100, and result[1]=20, ratio=5>x, and the condition is TRUE.

If result[1]=60 and result[2]=30, ratio=2<x, and the condition is FALSE.

This calibration example is also illustrated in FIGS. 3-6, as is the linear regression of the results. In embodiments of the present invention, param1 represents the slope of the line represented by a linear regression of results [1] to [n], while param2 represents the slope of the line represented by a linear regression of result points 2 to point n. In some embodiments of the present invention, the program code defines further parameters (e.g., param3, param4 . . . ).

The program code calculates param1 and param2 (and any additional parameters) by utilizing a classical linear regression formula, as illustrated below:

$$\text{slope} = ((n * \text{SumOf}(xy)) - (\text{SumOf}(x) * \text{SumOf}(y))) / ((n * \text{SumOf}(x*x)) - (\text{SumOf}(x) * \text{SumOf}(x)))$$

Returning to FIG. 1, to calibrate the system, the program code obtains a second set of calibration requirements (122). In some embodiments of the present invention, the calibration requirements can be understood as control requirements, which are requirements that differ from the data utilized for the original training. In other embodiments of the present invention, rather than utilizing control requirements, which differ from the training data, the program code calibrates the NLC utilizing the original set of training requirements. In utilizing this original set, the program code utilizes various combinations of the training requirements to simulate the various potential key performance indicators (KPIs). Thus, the calibration requirements utilized to calibrate the system can be one or more of the training requirements (i.e., requirements utilized to train the NLC) and/or the control requirements i.e., (requirements that are new to the NLC). The callibration requirements can be input through any I/O device communicatively coupled to the one or more processors executing the program code. Each requirement obtained was previously (e.g., manually or automatically) classified to fit into one of a finite number of established structural quality classes. For example, in some embodiments of the present invention, each requirement is classified, before being obtained by the program code, into one of the following categories, representing structural quality classes: "specific & atomic", "specific NOT atomic", "NOT specific", "AMBIGUOUS", and/or "Either not Atomic or not Specific".

As discussed above, the program code establishes a set of parameters (e.g., x, param1, param2 . . . param_n) (124) for each calibration requirement. In some embodiments of the present invention, the program code, through a client, can prompt a user to qualify the requirements quality, for each of the finite number of established structural quality classes. Based on this process, the program code determines an optimal (calibrated) parameter based on parameters for individual requirements (126), thus, determining an optimal set of configuration values for x, param1, param2, etc. FIGS. 3-5 depict x, param1, param2.

As the purpose of the parameters is to set boundaries for classifying requirements into classes (e.g., with high confidence), each parameter defines a specific range. For example, in some embodiments of the present invention, Config_Param1 is defined as the median between the highest slope of result[1] to result[n] for "specific & atomic" and the lowest slope of result[1] to result[n] for "NOT specific." For example, if the highest slope of result[1] to result[n] for "specific & atomic" was "0.5", and the lowest slope of result[1] to result[n] for "NOT specific" would be 1.0, then Config_Param1 will be set as 0.75 (i.e., the median between 0.5 and 1.0). In some embodiments of the present invention, Config_Param2 is defined as the median between the highest slope of result[2] to result[n] for "specific NOT atomic" and the lowest slope of result[2] to result[n] for "NOT specific." Further, Config_x can be defined as the median value between the lowest result[0]/result[1] or result[1]/result[2] value found for cases "specific & atomic" or "specific NOT atomic," respectively, and the highest result[0]/result[1] ratio for "NOT specific." Expanding on this non-limiting example, if the lowest result[0]/result[1] ("for specific and atomic") were 6, the lowest result[1]/result[2] ("for specific NOT atomic") were 5, and the highest result[0]/result[1] (for "not specific") was 3, Config_x will be the median between 5 and 3, (i.e., 4.0). In embodiments of the present invention, a user can override the calibrated parameters.

Returning to FIG. 1, the program code stores the calibrated parameters in a database (128). For example, the program code can save the parameters in a database configuration file, for use in subsequent analyses. An example of parameters retained in a database is provided below. This is a non-limiting example as the parameters can vary based on the classifier.

Config_x=2;

Config_Param1=0.25

Config_param2=0.25

In some embodiments of the present invention, program code performs structural quality analysis of a requirement (130). The program code obtains a requirement (e.g., via an input through a client) (132). The program code applies the trained and compiled NLC to the new requirement (134). To apply the NLC, the program code invokes the NLC and responsive to invoking the NLC, obtains an array of label/value structures. Based on obtaining the array of label/value structures, the program code normalizes the results (136). In normalizing the array of label values, the program code sets a top result (result[0]) in the array to a fixed value (e.g., 100). Below is an example of the normalization by the program code.

```
For (x = 0; x < Results.length x++){
Result.value = (100 * Result[x].value) / Result[0].value
}
```

The program code classifies the requirement (e.g., based on business rules) (137). The analysis can follow the following rules:

If only one label returns a good match and all others are equally low, then program code determines that the requirement is as follows:

a) specific because a label is established with confidence (e.g., high confidence), over any other labels, b) atomic, since no other labels are found to be relevant.

If the first two/three/n labels return a good match (the values of result[0] and result[1] (etc.) are close), and all other label values are far lower and more or less equal, then program code determines that the requirement is as follows:

a) specific as labels can be identified clearly, b) not atomic since more than one label were identified with confidence.

If the result array values do not flatten out, it indicated that the NLC is unable to make a high confidence match, and the requirement cannot easily be labeled. Thus, if the first two examples above are relevant, but one of the high ranking labels is "ambiguous", the program code determined that the requirement contains at least one ambiguous term. However, if none of the previous conditions hold, the program code determined that the requirement is either unspecific or non-atomic.

In some embodiments of the present invention, based on how the parameters (e.g., x, param1, param2, etc.) compare to the configured parameters (e.g., Config_x, Config_Param1, Config_Param2, etc.) the program code automatically assigns a label to the requirement. As illustrated in FIG. 1, the program code can classify the requirement based on business rules (137). Below is an example of specific pre-configured business rules that provide a non-limiting example as to how the program code utilizes business rules to enhance the analysis and results. In the situation where interest is only in the classification against the top two results, the program code can apply the business rules to determine the following:

Obtain Result[0]/Result[1], and compare it against configuration parameter Config_x Obtain Result[1]/Result[2], and compare it against configuration parameter Config_x Obtain the slope of linear regression Result[1] to Result[max−1] and set it to param1

Obtain the slope of linear regression Result[2] to Result[max−1] and set it to param2

The program code obtains the results below:

```
IF (Result[0] / Result[1] >= Config_x) AND (Slope of linear regression Result[1] to
Result[max−1] <= config_param1)
//i.e., ONLY result[0] is clearly identified and the in-consequent results flatten out
RequirementStatus = "specific & atomic";
ELSE IF (Result[1] / Result[2] >= Config_x) AND (Slope of linear regression Result[2]
to Result[max−1] <= param2)
//i.e. Both results 1 and 2 are clearly identified and the in-consequent results flatten out
RequirementStatus = "specific NOT atomic";
ELSE IF (Result[0] / Result[1] < Config_x) AND (Slope of linear regression Result[1] to
Result[max−1] > Config_ param1)
AND (Result[1] / Result[2] < Config_x) AND (Slope of linear regression Result[2] to
Result[max−1] < Config_param2)
//the first 2 results are not meaningfully stronger than subsequent values, and results 2 . . .
n do not flatten out
RequirementStatus = "NOT specific";
ELSE IF (Result[0] / Result[1] >= Config_x) AND (Slope of linear regression Result[1]
to Result[max−1] <= Config_param1) AND (label[0] == 'AMBIGUOUS')
OR
(Result[1] / Result[2] >= Config_x) AND (Slope of linear regression Result[2] to
Result[max−1] <= Config_param2) AND (label[0] == 'AMBIGUOUS' OR label[1] ==
'AMBIGUOUS')
//i.e. similar to first 2 conditions, but one of the top results are labeled as AMBIGUOUS
RequirementStatus = "Ambiguous";
ELSE
//i.e., scenarios that do not fall in any of the other categories
RequirementStatus = "Either Not Atomic or Not Specific";
```

Returning to FIG. 1, the program code provides real-time feedback to the user (138). In some embodiments of the present invention, the program code returns Requirement Status and displays this value to the user. The user can revise the requirement to improve the structural quality, if issues are indicated by the program code in the analysis.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the one or more servers executing the program code in the workflows of FIGS. 1-2 can each be understood as a cloud computing node 10 (FIG. 6) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
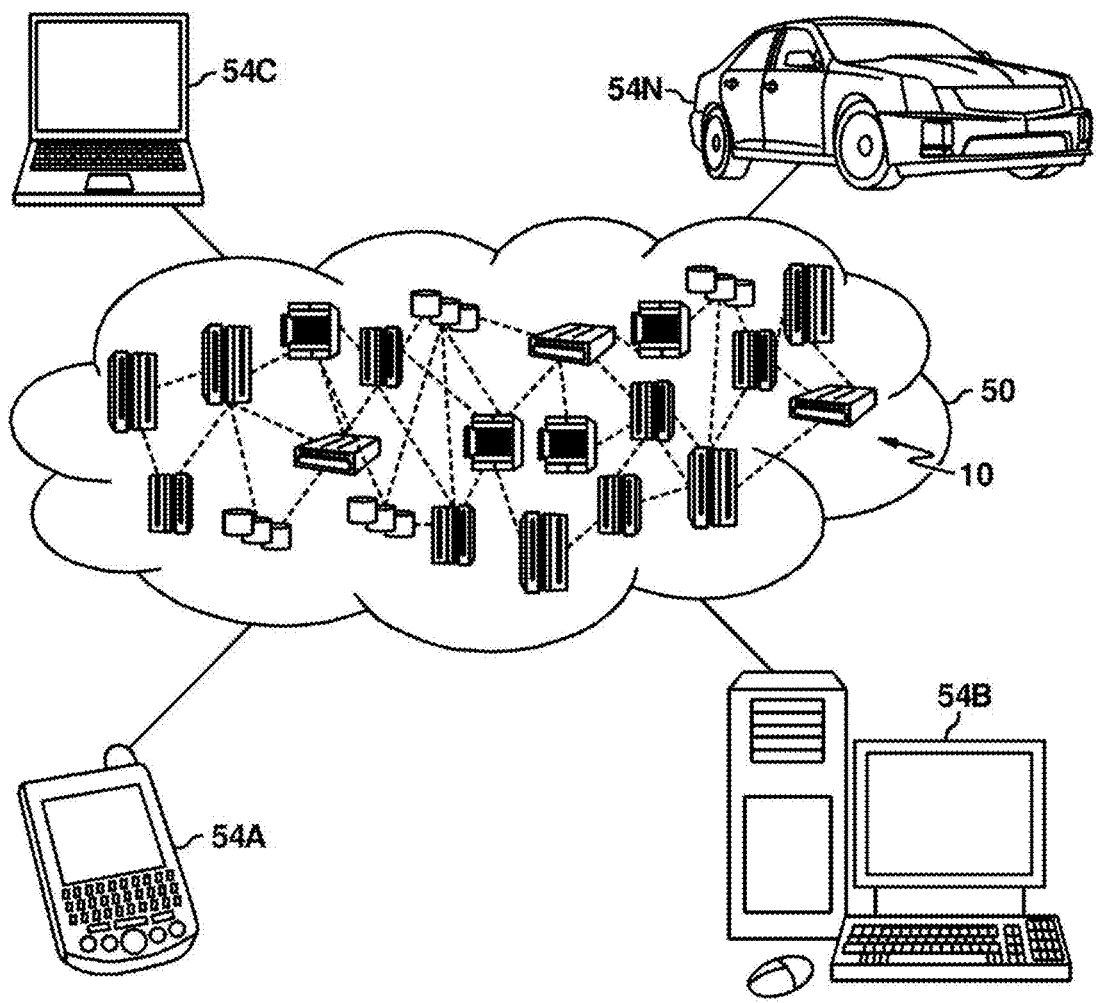
FIG. 7 depicts a cloud computing environment according to an embodiment of the present invention.
Figure 8:
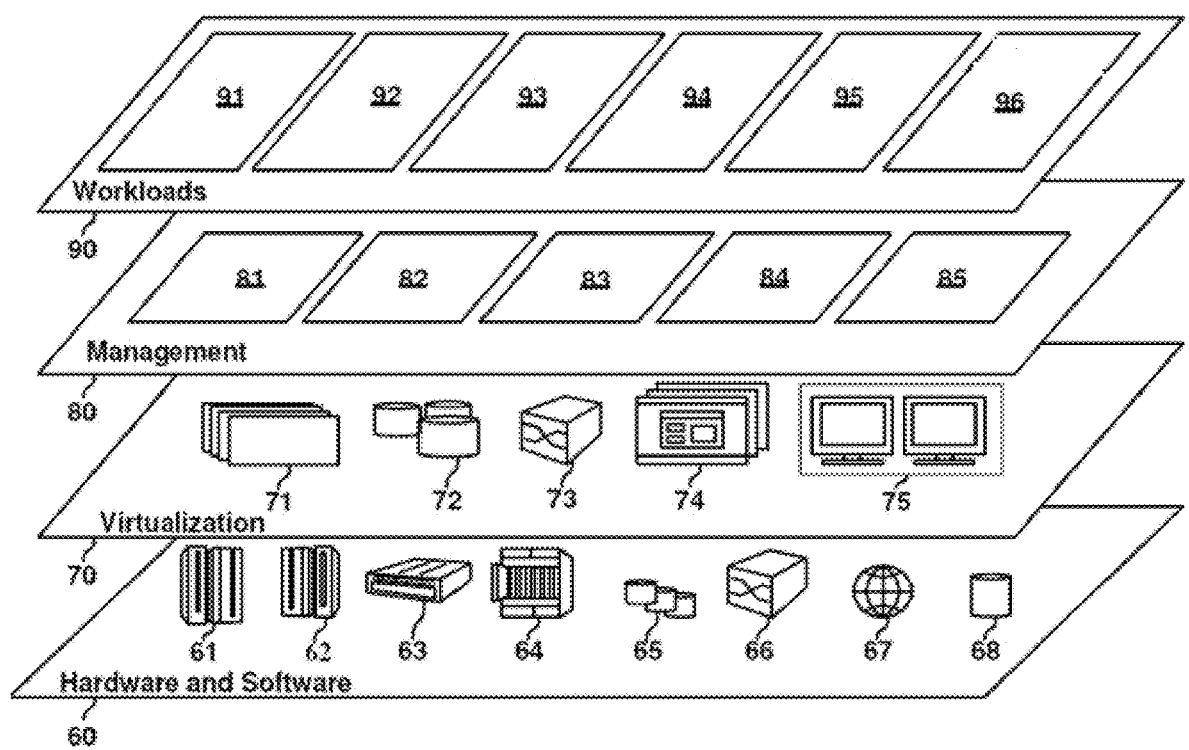
FIG. 8 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine-learning based structural quality analysis 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors, a requirement, wherein the requirement comprises a structure defined by textual content;
    identifying, by the one or more processors, content relevant to one or more predefined labels in the structure, based on applying a natural language classification algorithm to the structure, wherein each predefined label indicates an atomic function;
    based on the identifying, generating, by the one or more processors, via the natural language classification algorithm, an array of values for each predefined label of the one or more predefined labels, wherein each value in the array of values corresponds to a level of confidence the natural language classification algorithm correctly identified the atomic function indicated by each predefined label, in the structure, wherein generating via the natural language classification algorithm, the array of values, further comprises:
        training, by the one or more processors, the natural language classification algorithm; and
        calibrating, by the one or more processors, the natural language classification algorithm, wherein the calibrating comprises generating and storing configuration parameters;
    ranking, by the one or more processors, the values in the array of values, wherein each value is paired with a corresponding predefined label of the one or more predefined labels, in descending order, based on the level of confidence of each predefined label;
    evaluating, by the one or more processors, the pairs, utilizing a linear regression, to identify a portion of the pairs above a relevance threshold, wherein the portion comprises one or more predefined labels relevant to the requirement; and
    based on identifying the one or more predefined labels relevant to the requirement, generating, by the one or more processors, a structural quality value for the requirement, wherein the structural quality requirement value is a value in a fixed set of structural quality requirement values.

2. The computer-implemented method of claim 1, wherein the ranking comprises identifying one or more labels with a highest value of the values.

3. The computer-implemented method of claim 1, wherein the structural quality value is selected from the fixed set of structural quality values consisting of: the requirement is specific and atomic, the requirement is specific, but not atomic, the requirement is not specific, the requirement is either not specific or not atomic, and the requirement contains ambiguous terminology.

4. The computer-implemented method of claim 1, further comprising:
    defining, by the one or more processors, the predefined labels, wherein the defining comprises:
        obtaining, by the one or more processors, data comprising one or more requirements, wherein the data further comprises respective labels for each requirement of the requirements; and
        generating, by the one or more processors, the predefined labels, based on analyzing the requirements and the respective labels.

5. The computer-implemented method of claim 1, wherein the utilizing the linear regression comprises applying the configuration parameters.

6. The computer-implemented method of claim 5, wherein training the natural language classification algorithm comprises:
    stemming, by the one or more processors, the set of training statements, wherein the stemming comprises removing extraneous text from each training statement.

7. The computer-implemented method of claim 1, wherein training the natural language classification algorithm comprises:
    importing, by the one or more processors, a set of training statements, wherein each training statement comprises a requirement corresponding to a predefined label of the predefined labels.

8. The computer-implemented method of claim 1, wherein calibrating the natural language classification algorithm comprises:
    normalizing, by the one or more processors, the values in the array of values generated by the natural language classification algorithm.

9. The computer-implemented method of claim 8, wherein calibrating the natural language classification algorithm further comprises:
    calibrating, by the one or more processors, the configuration parameters, wherein a portion of the configuration parameters comprise the relevance threshold.

10. The computer-implemented method of claim 9, wherein the calibrating further comprises:

obtaining, by the one or more processors, calibration requirements comprising the pre-defined labels; and utilizing, by the one or more processors, the calibration requirements to determines the configuration parameters.

11. The computer-implemented method of claim 10, wherein obtaining the calibration requirements comprises:

stemming, by the one or more processors, the calibration requirements, wherein the stemming comprises removing extraneous text from each calibration requirement.

12. The computer-implemented method of claim 1, further comprising:

transmitting, by the one or more processors, the structural quality value for the requirement to a client.

13. The computer-implemented method of claim 1, further comprising:

obtaining, by the one or more processors, an indication of acceptance of the structural quality requirement, via the client; and re-calibrating, by the one or more processors, the natural language classification algorithm, based on the indication.

14. A computer program product comprising:

a computer readable storage medium readable by one or more processors and storing instructions for execution by the one or more processors for performing a method comprising:

obtaining, by the one or more processors, a requirement, wherein the requirement comprises a structure defined by textual content;

identifying, by the one or more processors, content relevant to one or more predefined labels, in the structure, based on applying a natural language classification algorithm to the structure, wherein each predefined label indicates an atomic function;

based on the identifying, generating, by the one or more processors, via the natural language classification algorithm, an array of values for each predefined label of the one or more predefined labels, wherein each value in the array of values corresponds to a level of confidence the natural language classification algorithm correctly identified the atomic function indicated by each predefined label, in the structure, wherein generating via the natural language classification algorithm, the array of values, further comprises:

training, by the one or more processors, the natural language classification algorithm; and calibrating, by the one or more processors, the natural language classification algorithm, wherein the calibrating comprises generating and storing configuration parameters;

ranking, by the one or more processors, the values in the array of values, wherein each value is paired with a corresponding predefined label of the one or more predefined labels, in descending order, based on the level of confidence of each predefined label;

evaluating, by the one or more processors, the pairs, utilizing a linear regression, to identify a portion of the pairs above a relevance threshold, wherein the portion comprises one or more predefined labels relevant to the requirement; and based on identifying the one or more predefined labels relevant to the requirement, generating, by the one or more processors, a structural quality value for the requirement, wherein the structural quality requirement value is a value in a fixed set of structural quality requirement values.

15. The computer program product of claim 14, wherein the ranking comprises identifying one or more labels with a highest value of the values.

16. The computer program product of claim 14, wherein the structural quality value is selected from the fixed set of structural quality values consisting of: the requirement is specific and atomic, the requirement is specific, but not atomic, the requirement is not specific, the requirement is either not specific or not atomic, and the requirement contains ambiguous terminology.

17. The computer program product of claim 14, further comprising:

defining, by the one or more processors, the predefined labels, wherein the defining comprises:

obtaining, by the one or more processors, data comprising one or more requirements, wherein the data further comprises respective labels for each requirement of the requirements; and generating, by the one or more processors, the predefined labels, based on analyzing the requirements and the respective labels.

18. A system comprising:

a memory;

one or more processors in communication with the memory;

program instructions executable by the one or more processors via the memory to perform a method, the method comprising:

obtaining, by the one or more processors, a requirement, wherein the requirement comprises a structure defined by textual content;

identifying, by the one or more processors, content relevant to one or more predefined labels in the structure, based on applying a natural language classification algorithm to the structure, wherein each predefined label indicates an atomic function;

based on the identifying, generating, by the one or more processors, via the natural language classification algorithm, an array of values for each predefined label of the one or more predefined labels, wherein each value in the array of values corresponds to a level of confidence the natural language classification algorithm correctly identified the atomic function indicated by each predefined label, in the structure, wherein generating via the natural language classification algorithm, the array of values, further comprises:

training, by the one or more processors, the natural language classification algorithm; and calibrating, by the one or more processors, the natural language classification algorithm, wherein the calibrating comprises generating and storing configuration parameters;

ranking, by the one or more processors, the values in the array of values, wherein each value is paired with a corresponding predefined label of the one or more predefined labels, in descending order, based on the level of confidence of each predefined label;

evaluating, by the one or more processors, the pairs, utilizing a linear regression, to identify a portion of the pairs above a relevance threshold, wherein the portion comprises one or more predefined labels relevant to the requirement; and based on identifying the one or more predefined labels relevant to the requirement, generating, by the one or more processors, a structural quality value for the requirement, wherein the structural quality requirement value is a value in a fixed set of structural quality requirement values.

\* \* \* \* \*